United States Patent
Wei et al.

(10) Patent No.: US 7,588,232 B2
(45) Date of Patent: Sep. 15, 2009

(54) SYNCHRONOUS ACTUATOR

(75) Inventors: Chia-Chun Wei, Taichung (TW); Jin-Cheng Lin, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 163 days.

(21) Appl. No.: 11/936,770

(22) Filed: Nov. 7, 2007

(65) Prior Publication Data

US 2009/0114060 A1    May 7, 2009

(51) Int. Cl.
*B66D 1/36* (2006.01)

(52) U.S. Cl. .................. 254/337; 254/336; 254/399; 211/117; 212/347; 248/328

(58) Field of Classification Search ............... 254/334, 254/335, 336, 339, 396, 397, 398, 399; 211/117; 212/348; 248/328
See application file for complete search history.

(56) References Cited

U.S. PATENT DOCUMENTS

| 326,336 | A | * | 9/1885 | Sandberg et al | 212/264 |
| 3,819,013 | A | * | 6/1974 | Crum | 187/242 |
| 5,078,364 | A | * | 1/1992 | Harrell | 254/387 |
| 6,152,426 | A | * | 11/2000 | Von Fange | 254/334 |
| 6,234,453 | B1 | * | 5/2001 | Block | 254/285 |
| 6,942,198 | B2 | * | 9/2005 | Huang | 254/387 |
| 7,195,216 | B2 | * | 3/2007 | Wang | 248/157 |
| 7,357,376 | B2 | * | 4/2008 | Assmann | 254/337 |

\* cited by examiner

*Primary Examiner*—Emmanuel M Marcelo
(74) *Attorney, Agent, or Firm*—Banger Shia (57) ABSTRACT

A synchronous actuator comprises a telescopic cylinder assembly having at least three pivotally connected cylinders, a drive assembly and a driven assembly. The drive assembly is connected to two adjacent cylinders. The driven assembly is connected to three adjacent cylinders. With the drive assembly and the driven assembly, the cylinders of the telescopic cylinder assembly can be extended or retracted synchronously in axial direction.

3 Claims, 8 Drawing Sheets

SYNCHRONOUS ACTUATOR

BACKGROUND OF THE INVENTION

1. Field of the Invention

The present invention relates to an actuator, and more particularly to a synchronous actuator.

2. Description of the Prior Art

Figure 1:
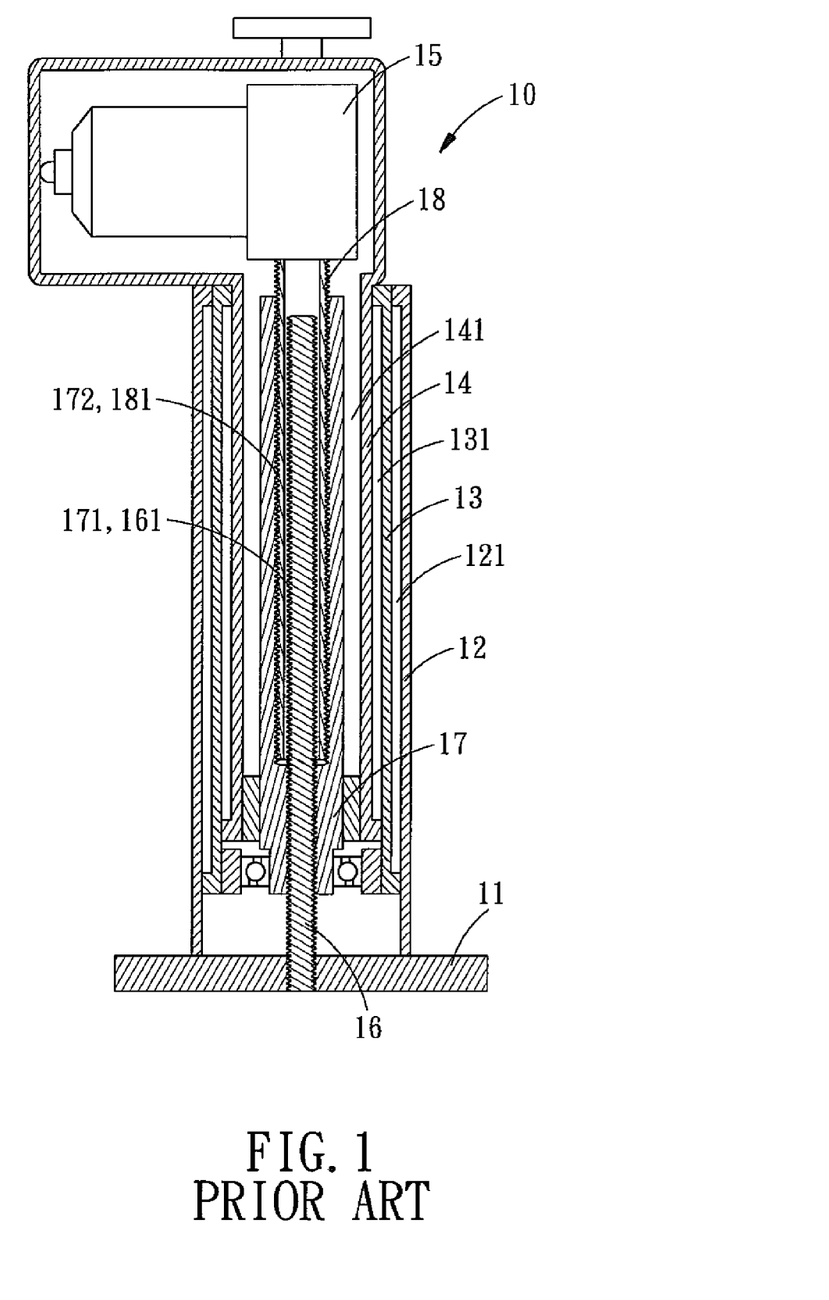
FIG. 1 is a cross sectional view of a conventional nonsynchronous actuator.

The use of actuators is quite extensive, and one kind of the actuators is the nonsynchronous actuator. Referring to FIG. 1, a conventional nonsynchronous actuator 10 comprises a base 11, a first cylinder 12, a second cylinder 13, a third cylinder 14, a motor 15, a first screw 16, a second screw 17 and a third screw 18. The first cylinder 12 includes a containing space 121, and one end of the first cylinder 12 is fixed to a top side of the base 11. The second cylinder 13 includes a containing space 131 and is pivotally disposed in the containing space 121 of the first cylinder 12. The third cylinder 14 includes a containing space 141 and is pivotally disposed in the containing space 131 of the second cylinder 13. The motor 15 is fixed to one end of the third cylinder 14. The first screw 16 is a hollow member and is defined with outer threads 161, and one end of the first screw 16 is fixed to the top side of the base 11. The second screw 17 is a hollow member and is defined with first inner threads 171 and second inner threads 172 that are threaded with the outer threads 161 of the first screw 16. One end of the second screw 17 is assembled to the open end of the containing space 131 of the second cylinder 13, and the other end of the second screw 17 is assembled to the open end of the containing space 141 of the third cylinder 14. The third screw 18 is a hollow member and is defined with first outer threads 181 that are threaded with the first inner threads 171 of the second screw 17. And one end of the third screw 18 is dynamically connected to the motor 15.

Figure 2:
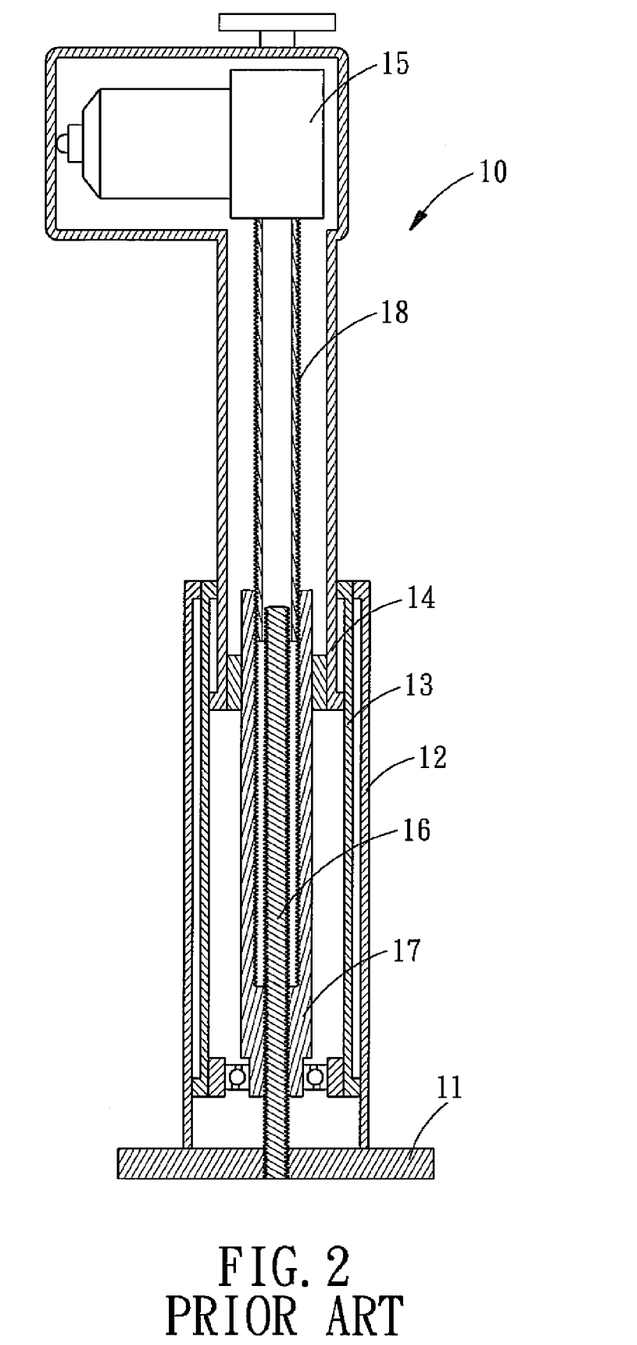
FIG. 2 is an illustrative view showing the extending motion of the conventional nonsynchronous actuator.
Figure 3:
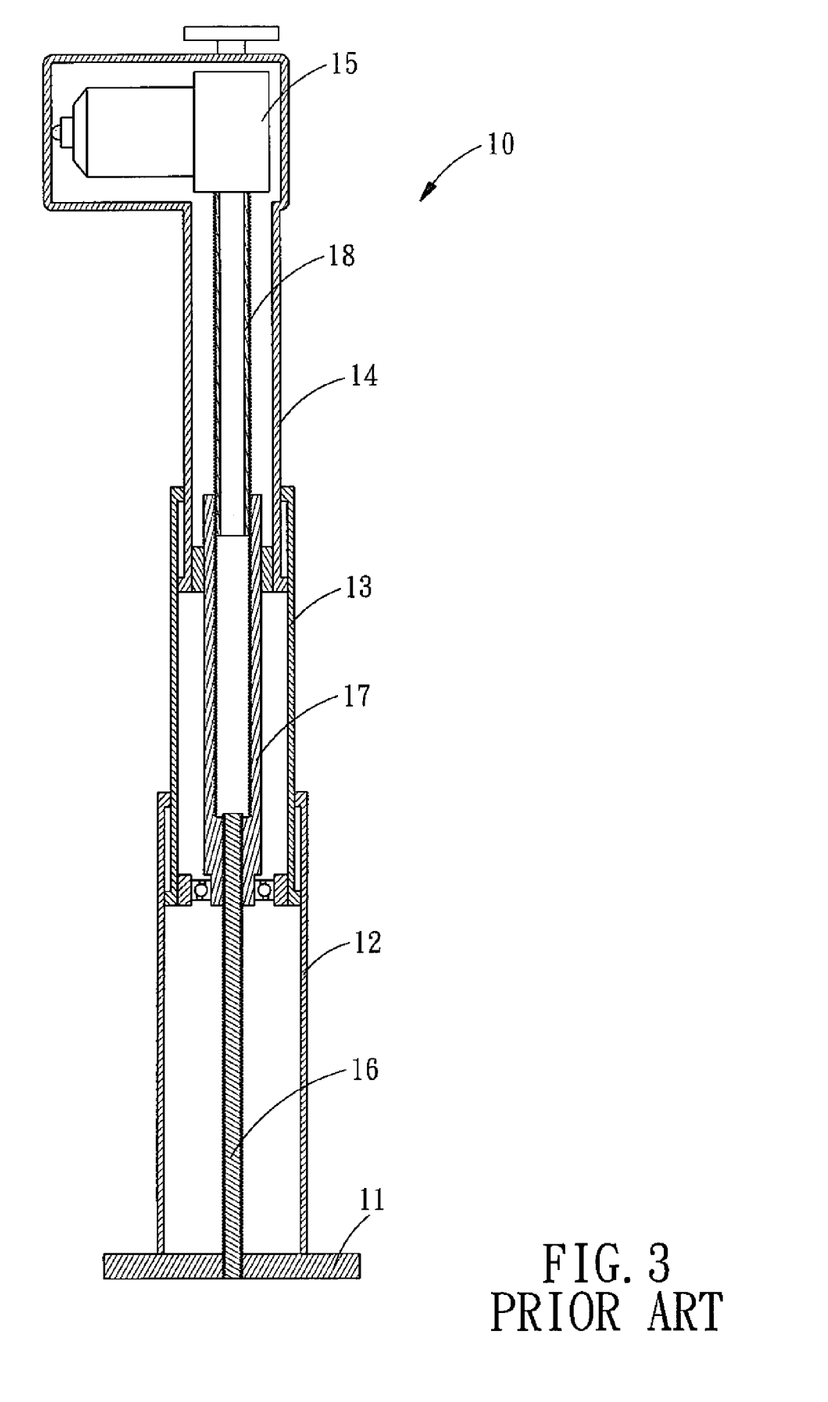
FIG. 3 is an illustrative view showing the extending motion of the conventional nonsynchronous actuator.

Referring to FIG. 2, during the operation of the nonsynchronous actuator 10, the motor 15 rotates the third screw 18 and drives it to move along the second screw 17, so as to drive the third cylinder 14 to move. When the third screw 18 rotates to the maximum length position relative to the second screw 17 as shown in FIG. 3, the third screw 18 will be driven by the motor 15 to rotate the second screw 17, and the second screw 17 will move along the first screw 16 and drive the second cylinder 13 to move. However, the above-mentioned conventional nonsynchronous actuator still has the following disadvantages:

Firstly, the extending and retracting motion of the conventional nonsynchronous actuator takes a lot of time, since the second cylinder 13 can be driven to move only when the third cylinder 14 moves to the end of maximum travel length.

Secondly, the components of the conventional nonsynchronous actuator are likely to be damaged, since the second screw 17 can be driven to rotate only when the third screw 18 rotates to the end of maximum travel length.

The present invention has arisen to mitigate and/or obviate the afore-described disadvantages.

SUMMARY OF THE INVENTION

The primary objective of the present invention is to provide a synchronous actuator which can be extended or retracted synchronously in axial direction.

To achieve the objective of the present invention, the synchronous actuator of the present invention comprises a telescopic cylinder assembly, a drive assembly and at least one driven assembly. The telescopic cylinder assembly includes a plurality of pivotally connected cylinders. The drive assembly includes a drive wheel, at least two pulleys and a pulling member. The drive assembly is connected to two adjacent cylinders. The drive wheel is pivotally disposed at the lower cylinder. The pulleys of the drive assembly are pivotally disposed at the two adjacent cylinders, respectively. Both ends of the pulling member of the drive assembly are connected to the upper cylinder, and the pulling member of the drive assembly is rolled around the drive wheel and the pulleys of the drive assembly, respectively. The driven assembly includes at least two pulleys and a pulling member. The driven assembly is connected to three adjacent cylinders. The pulleys of the driven assembly are pivotally disposed at the upper cylinder and the middle cylinder, respectively. Both ends of the pulling member of the driven assembly are connected to the upper cylinder and the lower cylinder, and the pulling member of the driven assembly is rolled around the pulleys of the driven assembly, respectively. With the drive assembly and the driven assembly, the cylinders of the telescopic cylinder assembly can be extended or retracted synchronously in axial direction. Thereby, the present invention has the advantages described as follows:

Firstly, the time of the extending and retracting motion of the synchronous actuator is reduced, since the cylinders of the telescopic cylinder assembly are moved axially, and are extended and retracted synchronously by the drive assembly and the driven assembly.

Secondly, the components of the synchronous actuator are unlikely to be damaged, since the pulling member of the drive assembly and the pulling member of the driven assembly slides through the pulleys, the friction force is reduced.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 4:
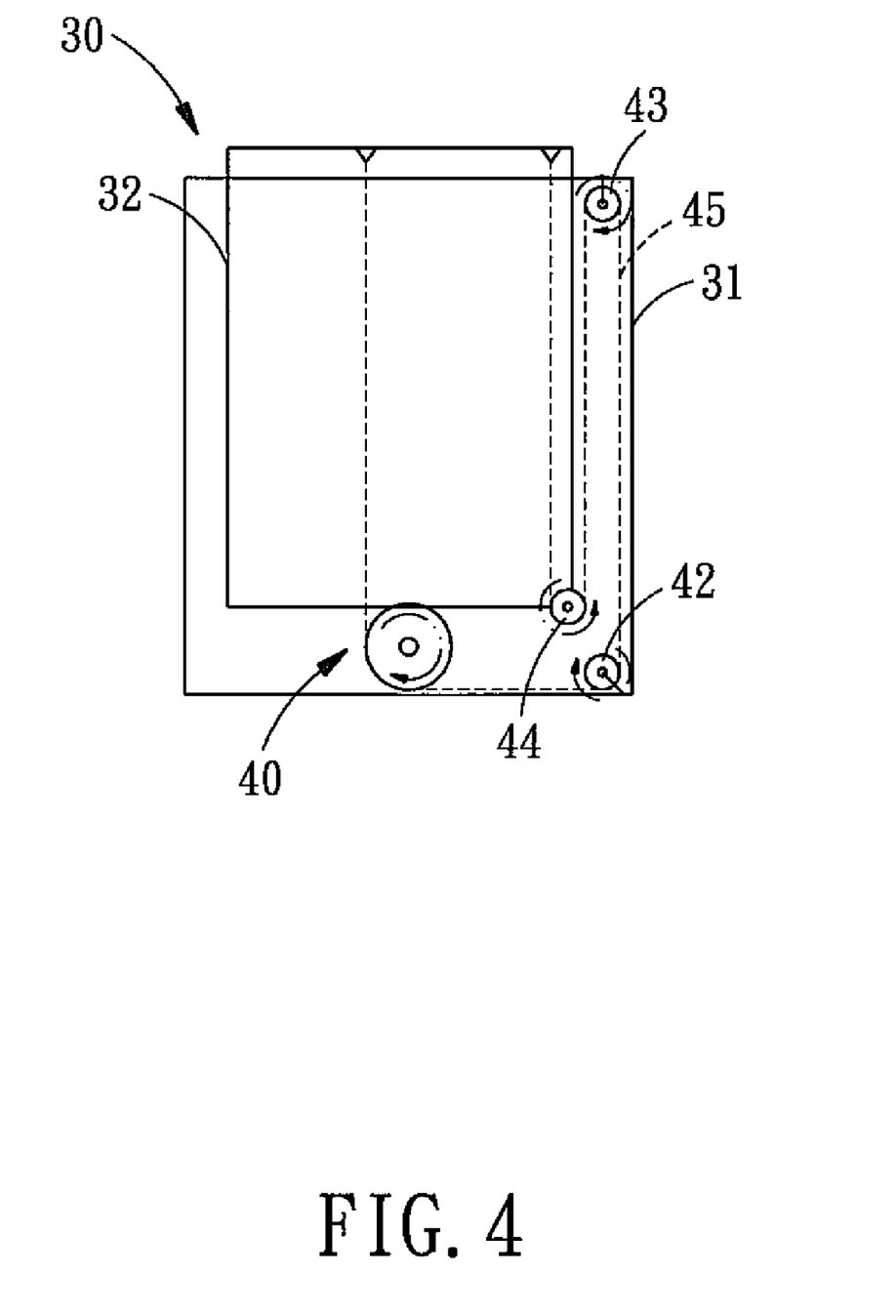
FIG. 4 is an assembly view of a synchronous actuator in accordance with the present invention.
Figure 5:
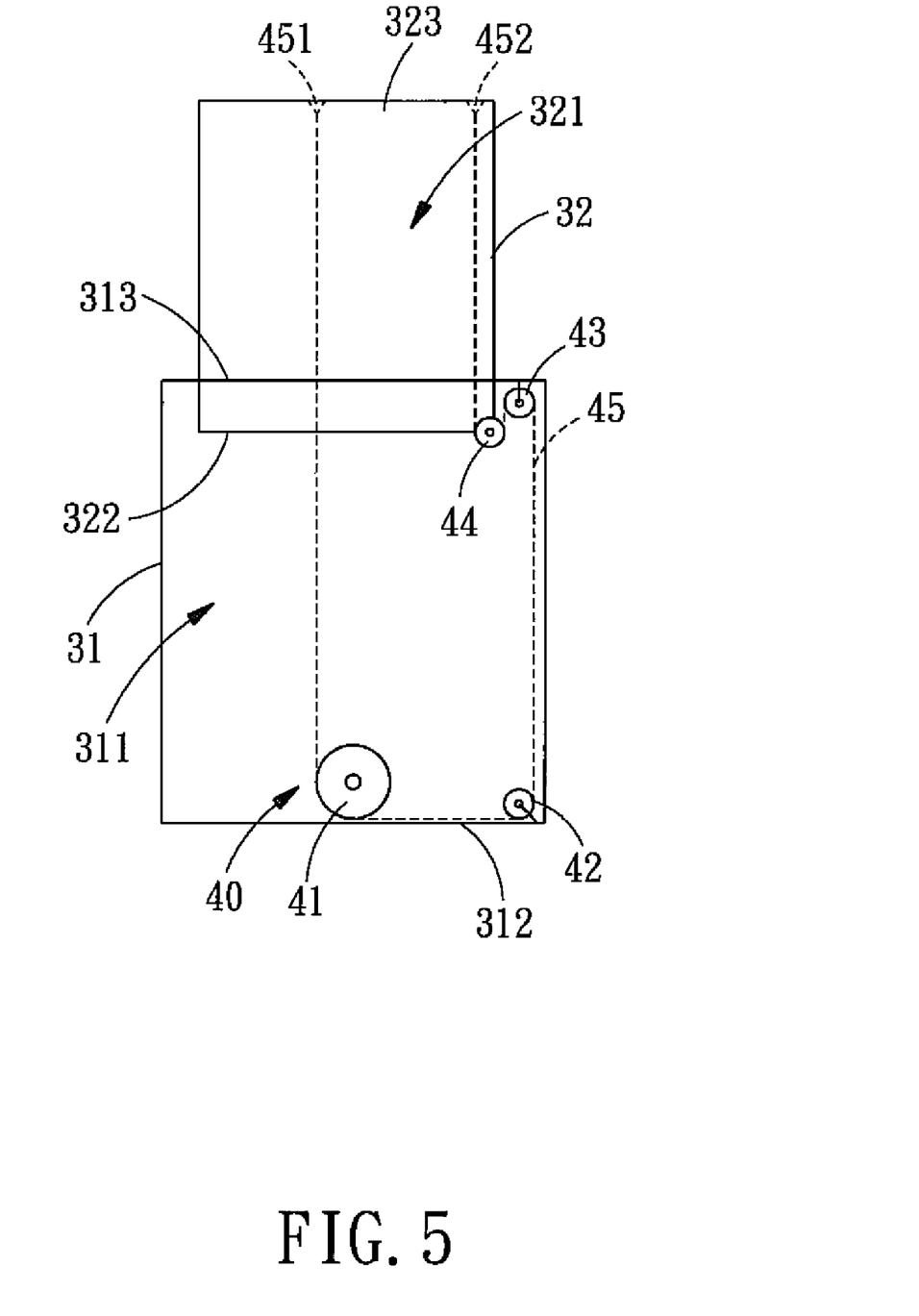
FIG. 5 is an illustrative view showing the operation of FIG. 4.

Referring to FIGS. 4 and 5, a synchronous actuator 20 in accordance with the present invention comprises a telescopic cylinder assembly 30 having a first cylinder 31, a second cylinder 32 and a third cylinder 33. The first cylinder 31 is axially formed with a containing space 311 having a closed end 312 and an open end 313. The second cylinder 32 is axially formed with a containing space 321 having a closed end 322 and an open end 323. The second cylinder 32 is pivotally disposed in the containing space 311 of the first cylinder 31. The third cylinder 33 is axially formed with a containing space 331 having a closed end 332 and an open end 333. The third cylinder 33 is pivotally disposed in the containing space 321 of the second cylinder 32.

The synchronous actuator 20 comprises a drive assembly 40 having a drive wheel 41, a first fixed pulley 42, a second fixed pulley 43, a movable pulley 44 and a pulling member 45. The drive wheel 41 is pivotally disposed at the closed end 312 of the first cylinder 31. The first fixed pulley 42 is pivotally disposed at the closed end 312 of the first cylinder 31 and is received in the containing space 311 of the first cylinder 31. The drive wheel 41 is located a distance from the first fixed pulley 42. The second fixed pulley 43 is pivotally disposed at the open end 313 of the first cylinder 31 and is received in the containing space 311 of the first cylinder 31. The second fixed pulley 43 is located a distance from the first fixed pulley 42. The movable pulley 44 is pivotally disposed at the closed end 322 of the second cylinder 32 and is received in the containing space 311 of the first cylinder 31. The movable pulley 44 is located a distance from the second fixed pulley 43. Both ends of the pulling member 45 are formed with a first jointing portion 451 and a second jointing portion 452, respectively. The pulling member 45 is a line. The first jointing portion 451 of the pulling member 45 is fixed to the open end 323 of the second cylinder 32, and the rest of the pulling member 45 is rolled around the drive wheel 41, the first fixed pulley 42, the second fixed pulley 43 and the movable pulley 44, respectively. And the second jointing portion 452 of the pulling member 45 is fixed to the open end 323 of the second cylinder 32.

Figure 6:
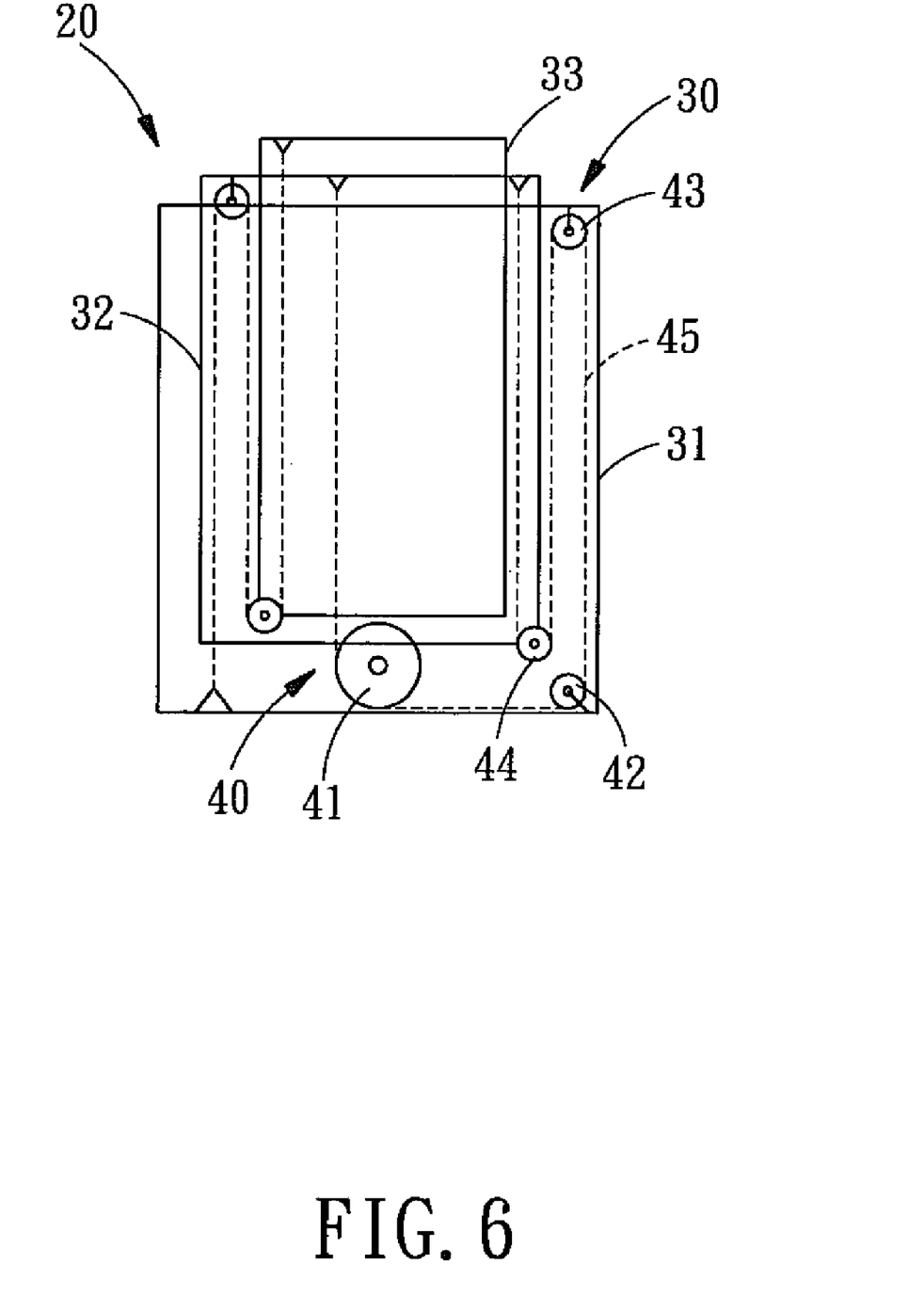
FIG. 6 is an assembly view of the synchronous actuator in accordance with the present invention.
Figure 7:
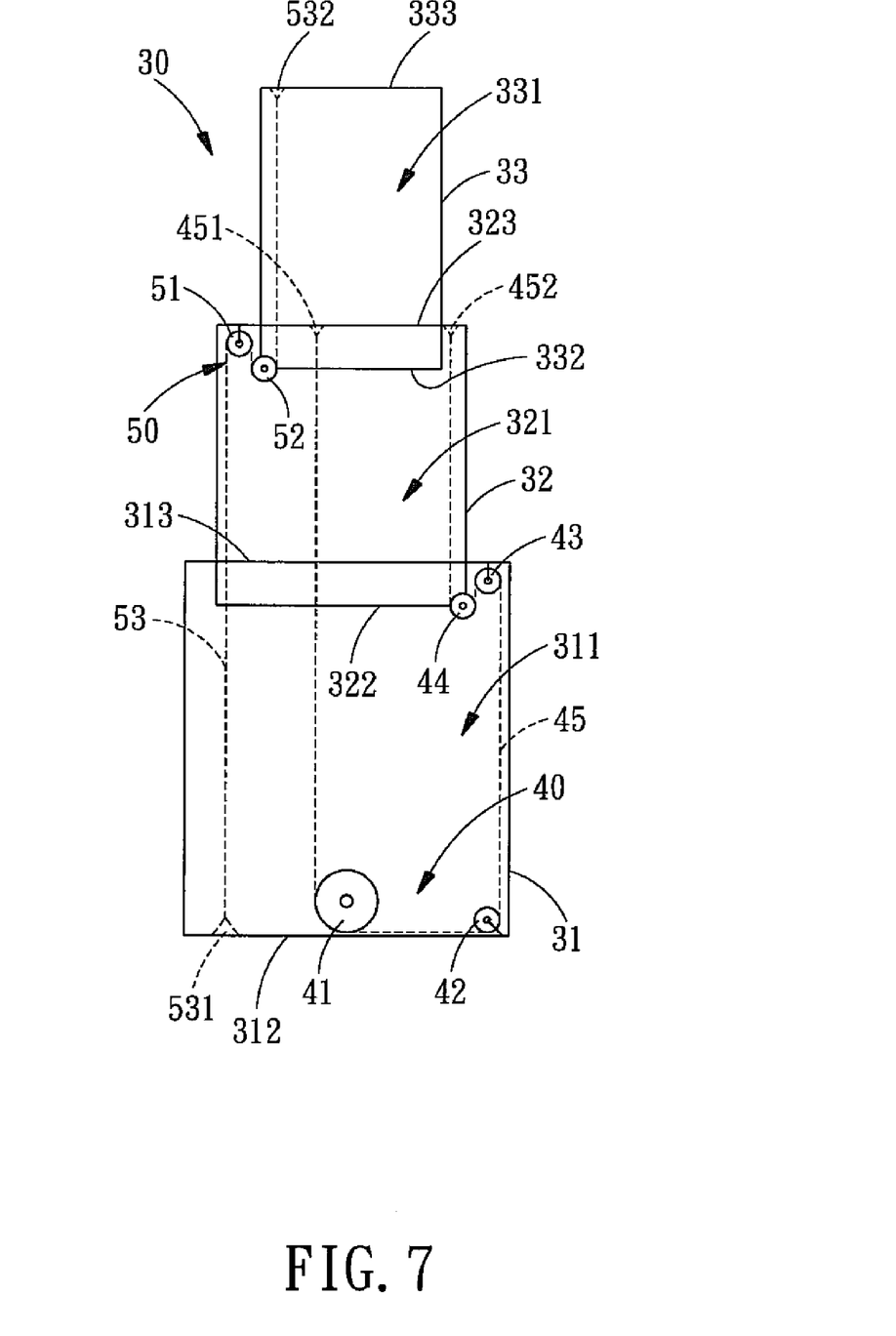
FIG. 7 is an illustrative view showing the operation of FIG. 6.

Referring to FIGS. 6 and 7, when the telescopic cylinder assembly 30 is added with the third cylinder 33, the synchronous actuator 20 must further include a driven assembly 50 to cooperate with the drive assembly 40. The third cylinder 33 is axially formed with the containing space 331 having the closed end 332 and the open end 333. The third cylinder 33 is pivotally disposed in the containing space 321 of the second cylinder 32.

The driven assembly 50 includes a fixed pulley 51, a movable pulley 52 and a pulling member 53. The fixed pulley 51 is pivotally disposed at the open end 323 of the second cylinder 32 and is received in the containing space 321 of the second cylinder 32. The movable pulley 52 is pivotally disposed at the closed end 332 of the third cylinder 33 and is received in the containing space 321 of the second cylinder 32. The movable pulley 52 is located correspondingly to the fixed pulley 51. Both ends of the pulling member 53 are formed with a first jointing portion 531 and a second jointing portion 532, respectively. The pulling member 53 is a line. The first jointing portion 531 of the pulling member 53 is fixed to the closed end 312 of the first cylinder 31, and the rest of the pulling member 53 is rolled around the fixed pulley 51 and the movable pulley 52, respectively. And the second jointing portion 532 of the pulling member 53 is fixed to the open end 333 of the third cylinder 33.

Figure 8:
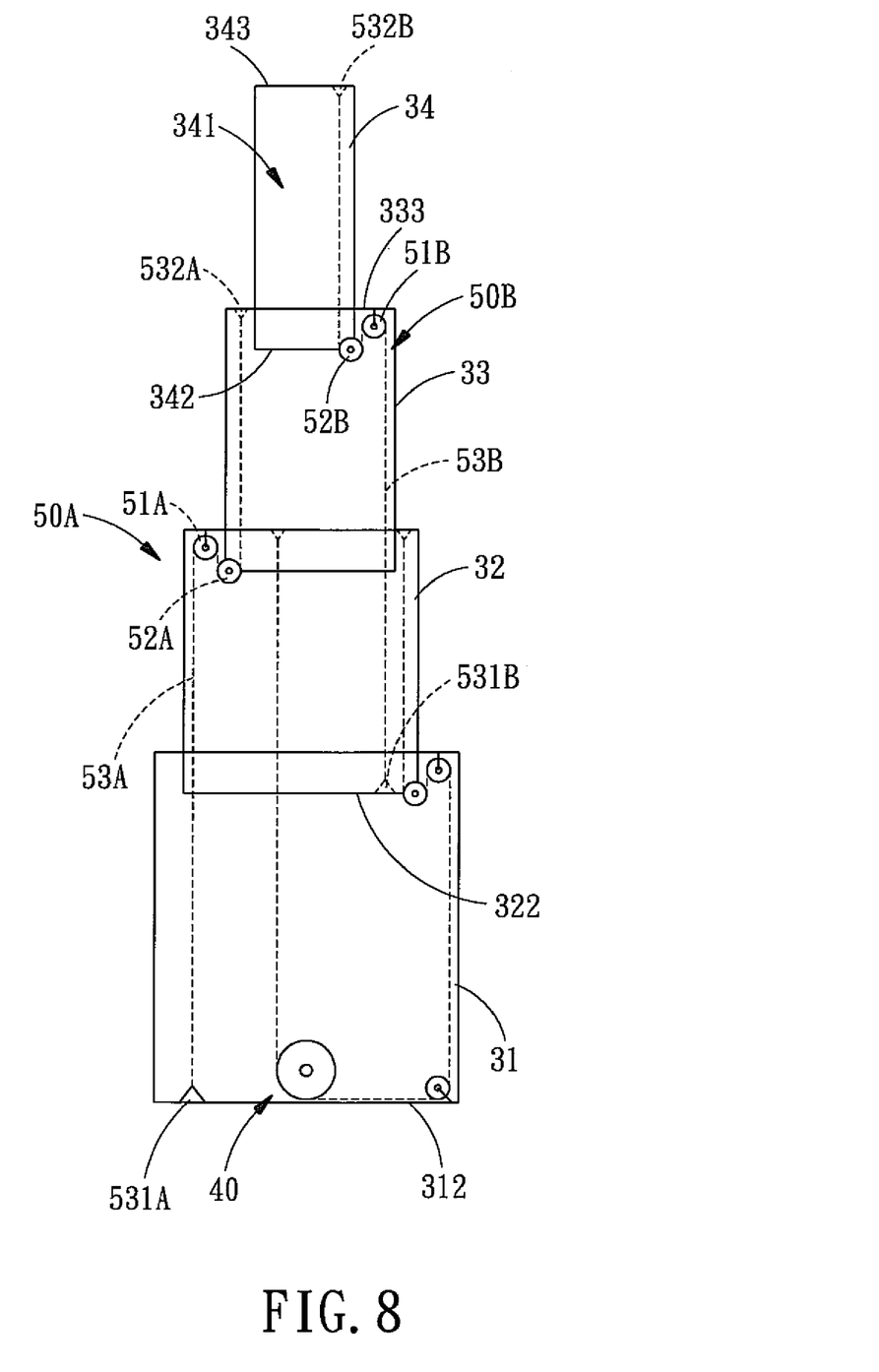
FIG. 8 is an assembly view of the synchronous actuator in accordance with the present invention.

Referring to FIG. 8, when the telescopic cylinder assembly 30 is added with a fourth cylinder 34, the synchronous actuator 20 must further include two driven assemblies 50A and 50B to cooperate with the drive assembly 40. The fourth cylinder 34 is axially formed with a containing space 341 having a closed end 342 and an open end 343. The fourth cylinder 34 is pivotally disposed in the containing space 331 of the third cylinder 33.

The driven assembly 50A includes a fixed pulley 51A, a movable pulley 52A and a pulling member 53A. The fixed pulley 51A is pivotally disposed at the open end 323 of the second cylinder 32 and is received in the containing space 321 of the second cylinder 32. The movable pulley 52A is pivotally disposed at the closed end 332 of the third cylinder 33 and is received in the containing space 321 of the second cylinder 32. The movable pulley 52A is located correspondingly to the fixed pulley 51A. Both ends of the pulling member 53A are formed with a first jointing portion 531A and a second jointing portion 532A, respectively. The pulling member 53A is a line. The first jointing portion 531A of the pulling member 53A is fixed to the closed end 312 of the first cylinder 31, and the rest of the pulling member 53A is rolled around the fixed pulley 51A and the movable pulley 52A, respectively. And the second jointing portion 532A of the pulling member 53A is fixed to the open end 333 of the third cylinder 33.

The driven assembly 50B includes a fixed pulley 51B, a movable pulley 52B and a pulling member 53B. The fixed pulley 51B is pivotally disposed at the open end 333 of the third cylinder 33 and is received in the containing space 331 of the third cylinder 33. The movable pulley 52B is pivotally disposed at the closed end 342 of the fourth cylinder 34 and is received in the containing space 331 of the third cylinder 33. The movable pulley 52B is located correspondingly to the fixed pulley 51B. Both ends of the pulling member 53B are formed with a first jointing portion 531B and a second jointing portion 532B, respectively. The pulling member 53B is a line. The first jointing portion 531B of the pulling member 53B is fixed to the closed end 322 of the second cylinder 32, and the rest of the pulling member 53B is rolled around the fixed pulley 51B and the movable pulley 52B, respectively. And the second jointing portion 532B of the pulling member 53B is fixed to the open end 343 of the fourth cylinder 34.

For a better understanding of the present invention, its operations and functions, reference should be made to FIGS. 4-8 again:

During the operation of the telescopic cylinder assembly 30, the drive wheel 41 of the drive assembly 40 is dynamically connected to a motor, such that the drive wheel 41 is coaxially rotated with the motor. Referring to FIG. 4, when the drive wheel 41 is rotated in a clockwise direction, the pulling member 45 is driven by the drive wheel 41 to slide through the first fixed pulley 42, the second fixed pulley 43 and the movable pulley 44, such that the pulling member 45 will pull the second cylinder 32 by using the first jointing portion 451 and the second jointing portion 452 to enable the second cylinder 32 to axially extend out of the first cylinder 31. At the same time, the second cylinder 32 synchronously drives the fixed pulley 51 of the driven assembly 50 to rotate and pushes the pulling member 53. When the length of the pulling member 53 is not changed, and the movable pulley 52 is moved by the pulling member 53, the third cylinder 33 is axially extend out of the second cylinder 32. When the drive wheel 41 is rotated in a counterclockwise direction, the second cylinder 32 will be axially retracted from the first cylinder 31. And the third cylinder 33 will be axially retracted from the second cylinder 32.

To summarize, the synchronous actuator of the present invention comprises a telescopic cylinder assembly, a drive assembly and a driven assembly. The telescopic cylinder assembly includes a plurality of pivotally connected cylinders. The drive assembly includes a drive wheel, at least two pulleys and a pulling member. The drive assembly is connected to two adjacent cylinders. The drive wheel is pivotally disposed at the lower cylinder. The pulleys of the drive assembly are pivotally disposed at the two adjacent cylinders, respectively. Both ends of the pulling member of the drive assembly are connected to the upper cylinder, and the pulling member of the drive assembly is rolled around the drive wheel and the pulleys, respectively. The driven assembly includes at least two pulleys and a pulling member. The driven assembly is connected to three adjacent cylinders. The pulleys of the driven assembly are pivotally disposed at the upper cylinder and the middle cylinder, respectively. Both ends of the pulling member of the driven assembly are connected to the upper cylinder and the lower cylinder, and the pulling member of the driven assembly is rolled around the pulleys of the driven assembly, respectively. With the drive assembly and the driven assembly, the cylinders of the telescopic cylinder assembly can be extended or retracted synchronously in axial direction.

While we have shown and described various embodiments in accordance with the present invention, it should be clear to those skilled in the art that further embodiments may be made without departing from the scope of the present invention.

What is claimed is:

1. A synchronous actuator, comprising:
   a telescopic cylinder assembly including at least three pivotally connected cylinders;
   a drive assembly including a drive wheel, at least two pulleys and a pulling member, the drive assembly being disposed at two adjacent cylinders, the drive wheel being pivotally disposed at a lower cylinder, the pulleys of the driven assembly being pivotally disposed at the two adjacent cylinders, respectively, both ends of the pulling member of the drive assembly being connected to an upper cylinder, the pulling member of the drive assembly being rolled around the drive wheel and the pulleys of the drive assembly, respectively; and
   at least one driven assembly including at least two pulleys and a pulling member, the driven assembly being disposed at three adjacent cylinders, the pulleys of the driven assembly being pivotally disposed at the upper cylinder and a middle cylinder, respectively, both ends of the pulling member of the driven assembly being connected to the upper cylinder and the lower cylinder, the pulling member of the driven assembly being rolled around the pulleys of the driven assembly, respectively, with the drive assembly and the driven assembly, the cylinders of the telescopic cylinder assembly are extended or retracted synchronously in axial direction.

2. The synchronous actuator as claimed in claim 1, wherein the telescopic cylinder assembly includes a first cylinder, a second cylinder and a third cylinder;
   the first cylinder is axially formed with a containing space having a closed end and an open end, the second cylinder is axially formed with a containing space having a closed end and an open end, the second cylinder is pivotally disposed in the containing space of the first cylinder, the third cylinder is axially formed with a containing space having a closed end and an open end, the third cylinder is pivotally disposed in the containing space of the second cylinder;
   the drive assembly includes the drive wheel, a first fixed pulley, a second fixed pulley, a movable pulley and the pulling member, the drive wheel is pivotally disposed at the closed end of the first cylinder, the first fixed pulley is pivotally disposed at the closed end of the first cylinder and is received in the containing space of the first cylinder, the drive wheel is located a distance from the first fixed pulley, the second fixed pulley is pivotally disposed at the open end of the first cylinder and is received in the containing space of the first cylinder, the second fixed pulley is located a distance from the first fixed pulley, the movable pulley is pivotally disposed at the closed end of the second cylinder and is received in the containing space of the first cylinder, the movable pulley is located a distance from the second fixed pulley, both ends of the pulling member of the drive assembly are formed with a first jointing portion and a second jointing portion, respectively, the pulling member of the drive assembly is a line, the first jointing portion of the pulling member of the drive assembly is fixed to the open end of the second cylinder, the rest of the pulling member of the drive assembly is rolled around the drive wheel, the first fixed pulley, the second fixed pulley and the movable pulley, respectively, the second jointing portion of the pulling member of the drive assembly is fixed to the open end of the second cylinder;
   the driven assembly includes a fixed pulley, a movable pulley and the pulling member, the fixed pulley is pivotally disposed at the open end of the second cylinder and is received in the containing space of the second cylinder, the movable pulley is pivotally disposed at the closed end of the third cylinder and is received in the containing space of the second cylinder, the movable pulley is located correspondingly to the fixed pulley, both ends of the pulling member of the driven assembly are formed with a first jointing portion and a second jointing portion, respectively, the pulling member of the driven assembly is a line, the first jointing portion of the pulling member of the driven assembly is fixed to the closed end of the first cylinder, the rest of the pulling member of the driven assembly is rolled around the fixed pulley and the movable pulley, respectively, and the second jointing portion of the pulling member of the driven assembly is fixed to the open end of the third cylinder.

3. The synchronous actuator as claimed in claim 2, wherein:
   the telescopic cylinder assembly further includes a fourth cylinder, the fourth cylinder is axially formed with a containing space having a closed end and an open end, the fourth cylinder is pivotally disposed in the containing space of the third cylinder;
   the synchronous actuator further includes the other driven assembly having a fixed pulley, a movable pulley and a pulling member, the fixed pulley of the other driven assembly is pivotally disposed at the open end of the third cylinder and is received in the containing space of the third cylinder, the movable pulley of the other driven assembly is pivotally disposed at the closed end of the fourth cylinder and is received in the containing space of the third cylinder, the movable pulley of the other driven assembly is located correspondingly to the fixed pulley, both ends of the pulling member of the other driven assembly are formed with a first jointing portion and a second jointing portion, respectively, the pulling member of the other driven assembly is a line, the first jointing portion of the pulling member of the other driven assembly is fixed to the closed end of the second cylinder, the rest of the pulling member of the other driven assembly is rolled around the fixed pulley and the movable pulley of the other driven assembly, respectively, and the second jointing portion of the pulling member of the other driven assembly is fixed to the open end of the fourth cylinder.

* * * * *